(12) United States Patent
Arikuma

(10) Patent No.: US 9,372,719 B2
(45) Date of Patent: Jun. 21, 2016

(54) INFORMATION PROCESSING DEVICE FOR CORRECTING PROCEDURE

(75) Inventor: Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 283 days.

(21) Appl. No.: 13/823,669

(22) PCT Filed: Nov. 2, 2011

(86) PCT No.: PCT/JP2011/006126
§ 371 (c)(1),
(2), (4) Date: May 9, 2013

(87) PCT Pub. No.: WO2012/060098
PCT Pub. Date: May 10, 2012

(65) Prior Publication Data
US 2013/0227574 A1   Aug. 29, 2013

(30) Foreign Application Priority Data

Nov. 5, 2010   (JP) .................................. 2010-248207

(51) Int. Cl.
G06F 9/46 (2006.01)
G06F 9/48 (2006.01)
G06F 9/44 (2006.01)
G06F 11/34 (2006.01)
G10L 17/00 (2013.01)

(52) U.S. Cl.
CPC .. G06F 9/48 (2013.01); G06F 9/44 (2013.01); G06F 9/4806 (2013.01); G06F 9/4843 (2013.01); G06F 11/3419 (2013.01); G06F 11/3433 (2013.01); G06F 11/3452 (2013.01); G10L 17/00 (2013.01)

(58) Field of Classification Search
None
See application file for complete search history.

(56) References Cited

U.S. PATENT DOCUMENTS

| 2002/0176404 A1* | 11/2002 | Girard | 370/352 |
| 2003/0120802 A1* | 6/2003 | Kohno | H04L 29/06 709/237 |
| 2006/0265218 A1* | 11/2006 | Samadani | 704/233 |
| 2007/0078960 A1* | 4/2007 | Dawson | G06F 9/5072 709/223 |

(Continued)

FOREIGN PATENT DOCUMENTS

| JP | H10111792 A | 4/1998 |
| JP | 2002099430 A | 4/2002 |

(Continued)

OTHER PUBLICATIONS

Wyne Wyne Kywe, et al., "Scheduling of Image Processing Using Anytime Algorithm for Real-Time System", Proceeding ICPR '06 Proceedings of the 18th International Conference on Pattern Recognition—vol. 03, Dec. 31, 2006, pp. 1095-1098. Cited in CN Office Action.

(Continued)

Primary Examiner — Charles Swift

(57) ABSTRACT

An information processing device 10 of an exemplary embodiment of the present invention includes: a process function information storing means 12 for storing performance information representing performance of respective process functions executing predetermined processes, respectively; and a procedure correcting means 11 for correcting a procedure composed of the process functions so that a performance requirement representing performance required for the whole procedure is satisfied based on the performance information of the respective process functions.

8 Claims, 9 Drawing Sheets

(56) References Cited

U.S. PATENT DOCUMENTS

| | | | |
|---|---|---|---|
| 2007/0179753 A1* | 8/2007 | Barajas et al. | 702/189 |
| 2009/0060223 A1* | 3/2009 | Sano | 381/94.3 |
| 2010/0026859 A1* | 2/2010 | Tsuruoka | 348/241 |
| 2011/0138391 A1* | 6/2011 | Cho et al. | 718/102 |

FOREIGN PATENT DOCUMENTS

| | | |
|---|---|---|
| JP | 2007066007 A | 3/2007 |
| JP | 2007102651 A | 4/2007 |
| JP | 2009259156 A | 11/2009 |

OTHER PUBLICATIONS

Chinese Office Action for CN Application No. 201180053273.7 issued on Jun. 27, 2014 with English Translation.

The international search report for PCT/JP2011/006126 mailed on Dec. 20, 2011.

Daisuke Fujiwara et al., "On the Scheduling of the Image Processing Procedure using Anytime Algorithm", ITE Technical Report, Jun. 17, 2003, vol. 27, No. 35, pp. 1 to 4.

\* cited by examiner

Fig.2

| ANALYSIS PROCESS ID | FUNCTION CATEGORY ID |
|---|---|
| VOICEPRINT RECOGNITION | SPEAKER SPECIFICATION |
| MICROPHONE POSITION + GENDER DETERMINATION | SPEAKER SPECIFICATION |
| ADAPTIVE FILTER NOISE REDUCTION | SPEECH NOISE REDUCTION |
| RULE BASE NOISE REDUCTION | SPEECH NOISE REDUCTION |
| SIMPLE FILTER NOISE REDUCTION | SPEECH NOISE REDUCTION |
| ⋮ | ⋮ |

Fig.3

| ANALYSIS PROCESS ID | ACCURACY (AVERAGE) | ACCURACY (90Percentile) | ACCURACY (VARIATION COEFFICIENT) | PROCESSING TIME (AVERAGE) | PROCESSING TIME (90Percentile) | PROCESSING TIME (VARIATION COEFFICIENT) |
|---|---|---|---|---|---|---|
| VOICEPRINT RECOGNITION | 0.90 | 0.83 | 0.05 | 200[msec] | 222[msec] | 0.20 |
| MICROPHONE POSITION + GENDER DETERMINATION | 0.79 | 0.67 | 0.20 | 50[msec] | 52[msec] | 0.05 |
| ADAPTIVE FILTER NOISE REDUCTION | 0.90 | 0.82 | 0.10 | 20[msec] | 26[msec] | 0.10 |
| RULE BASE NOISE REDUCTION | 0.89 | 0.80 | 0.13 | 19[msec] | 20[msec] | 0.05 |
| SIMPLE FILTER NOISE REDUCTION | 0.73 | 0.70 | 0.03 | 17[msec] | 18.6[msec] | 0.02 |
| ... | ... | ... | ... | ... | ... | ... |

| FUNCTION CATEGORY ID | PROCESSING TIME DISTRIBUTION WIDTH [msec] | CORRELATION COEFFICIENT |
|---|---|---|
| SPEAKER SPECIFICATION | 150 | 0.6 |
| SPEECH NOISE REDUCTION | 3 | 0.8 |
| ⋮ | ⋮ | ⋮ |

Fig.9

| NUMBER OF TIMES OF CORRECTION | SPEECH NOISE REDUCTION | | SPEAKER SPECIFICATION | | AVERAGE TOTAL PROCESSING TIME |
|---|---|---|---|---|---|
| | ACCURACY REQUIREMENT | PROCESSING TIME REQUIREMENT | ACCURACY REQUIREMENT | PROCESSING TIME REQUIREMENT | |
| 0 | 0.88 | 20 | 0.78 | 200 | 220 |
| 1 | 0.88 | 19.6 | 0.78 | 140 | 159.6 |
| 2 | 0.88 | 19.3 | 0.78 | 110 | 129.3 |

INFORMATION PROCESSING DEVICE FOR CORRECTING PROCEDURE

This application is a National Stage Entry of PCT/JP2011/006126 filed Nov. 2, 2011, which claims priority from Japanese Patent Application 2010-248207 filed Nov. 5, 2010, the contents of all of which are incorporated herein by reference, in their entirety.

TECHNICAL FIELD

The present invention relates to an information processing device, more specifically, relates to an information processing device for solving a procedure in accordance with a requirement in a system which operates by integrating a plurality of process functions.

BACKGROUND ART

In an information processing system which operates by integrating a plurality of functions such as analysis processes, solution of a procedure is performed for execution of the plurality of functions by an optimum algorithm. An example of a technique for such procedure solution is a system disclosed in Patent Document 1. Herein, an optimum algorithm judgment device disclosed in Patent Document 1 will be described with reference to FIG. 8 of Patent Document 1.

An optimum algorithm judgment device 100 shown in FIG. 8 of Patent Document 1 is equipped with an algorithm registering unit 101, an optimum pattern judgment condition designating unit 102, an algorithm designating unit 103, a search pattern extracting unit 104, a search pattern executing unit 105, and an optimum pattern judging unit 107. The optimum algorithm judgment device 100 configured as described above selects an algorithm in the following manner.

At first, a user designates input data by a data inputting unit 106 and sets a judgment condition by the optimum pattern judgment condition designating unit 102. In a case that the user designates algorithms to be used, the user designates the algorithms to be used by the algorithm designating unit 103. Next, the search pattern extracting unit 104 selects algorithms and constructs "combination patterns" as patterns of combinations of algorithms. Subsequently, regarding all of the "combination patterns," the search pattern executing unit 105 executes the "combination patterns" and generates respective output data. Next, the optimum pattern judging unit specifies an optimum pattern and outputs information such as optimum data and an optimum combination pattern.

[Patent Document 1] Japanese Unexamined Patent Application Publication No. 2007-066007

However, the optimum algorithm judgment device disclosed in Patent Document 1 described above does not have a means for estimating the accuracy of processing and a processing time. Consequently, it is impossible to make a trade-off between the accuracy of processing and a processing time in accordance with a user's request, and there arises a problem of difficulty of solution of a procedure according to the requested accuracy of processing and processing time.

Further, in the optimum algorithm judgment device described above, there is a need to generate "combination patterns" as candidates and actually execute a plurality of patterns in order to judge an optimum algorithm at certain time. Consequently, as the kind and number of analysis processes increase, a processing time necessary for solving a procedure satisfying user's functional requirements and non-functional requirements increases. Moreover, because the processes are actually executed for the purpose of judgment of an optimum algorithm, there arises a problem of decrease of the performance of a process execution system.

SUMMARY

Accordingly, an object of the present invention is to solve the aforementioned problems, "difficulty of solution of a procedure satisfying a required condition" and "decrease of performance."

In order to achieve the object, an information processing device according to an exemplary embodiment of the present invention includes:

a process function information storing means for storing performance information representing performance of respective process functions executing predetermined processes, respectively; and a procedure correcting means for correcting a procedure composed of the process functions so that a performance requirement representing performance required for the whole procedure is satisfied based on the performance information of the respective process functions.

Further, a program according to another exemplary embodiment of the present invention is a program including instructions for causing an information processing device including a process function information storing means for storing performance information representing performance of respective process functions executing predetermined processes, respectively, to realize:

a procedure correcting means for correcting a procedure composed of the process functions so that a performance requirement representing performance required for the whole procedure is satisfied based on the performance information of the respective process functions.

Further, an information processing method according to another exemplary embodiment of the present invention includes, in an information processing device including a process function information storing means for storing performance information representing performance respective process functions executing predetermined processes, respectively, correcting a procedure composed of the process functions so that a performance requirement representing performance required for the whole procedure is satisfied based on the performance information of the respective process functions.

With the configurations described above, the present invention can realize solution of a procedure according to required performance, and can achieve increase of the performance of a system which executes a procedure.

BRIEF DESCRIPTION OF DRAWINGS

FIG. 2 is a diagram showing an example of a data structure of an analysis process functional information table stored in analysis process information DB disclosed in FIG. 1;

FIG. 3 is a diagram showing an example of a data structure of an analysis process non-functional information table stored in the analysis process information DB disclosed in FIG. 1;

FIG. 9 is a diagram showing an example of a transition of non-functional requirements for each analysis process during execution of the analysis process non-functional requirement estimation process in the procedure solving system disclosed in FIG. 1;

EXEMPLARY EMBODIMENTS

First Exemplary Embodiment

Figures 4, 5:
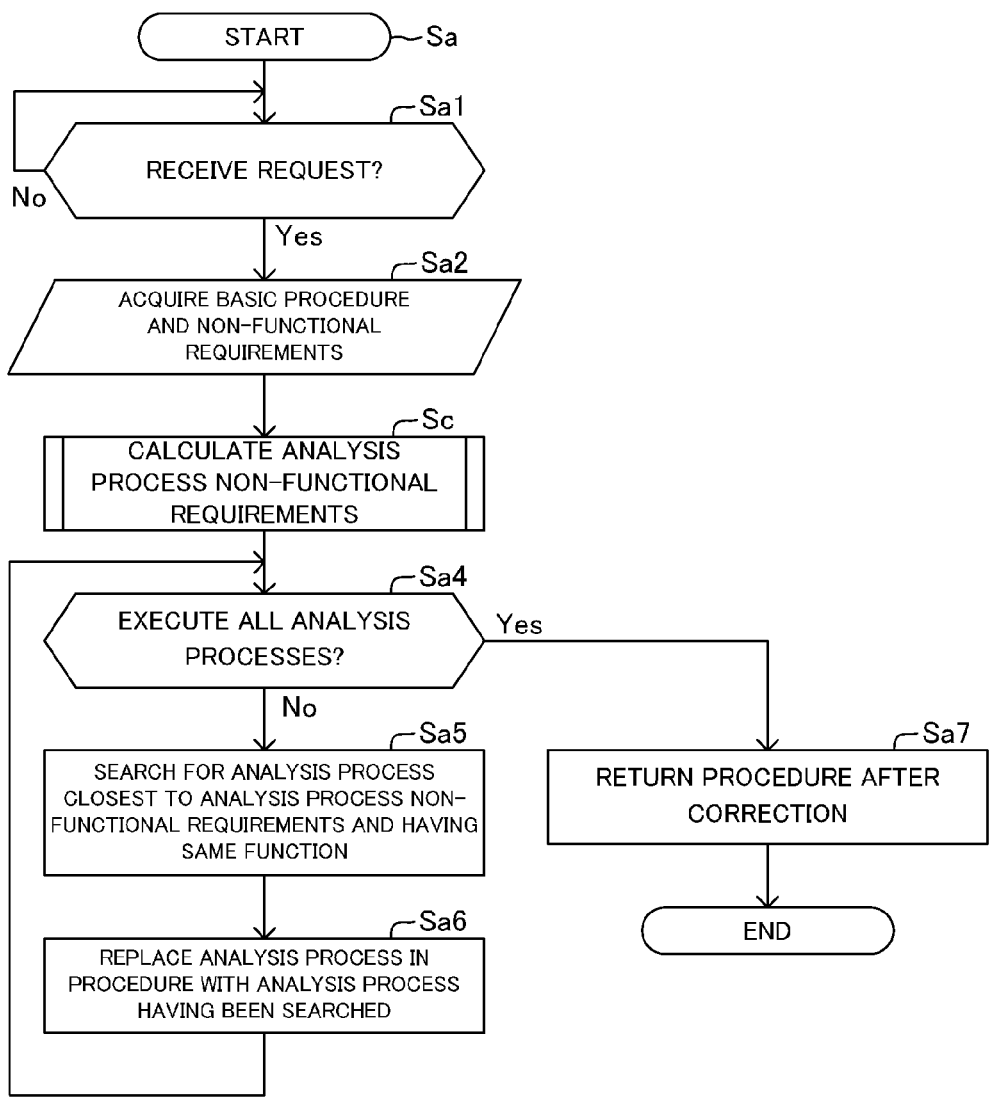
FIG. 4 is a diagram showing an example of a data structure of a function-category accuracy processing-time correlation table stored in the analysis process information DB disclosed in FIG. 1.
FIG. 5 is a flowchart showing a flow of a procedure correction process executed in the procedure solving system disclosed in FIG. 1.
Figure 6:
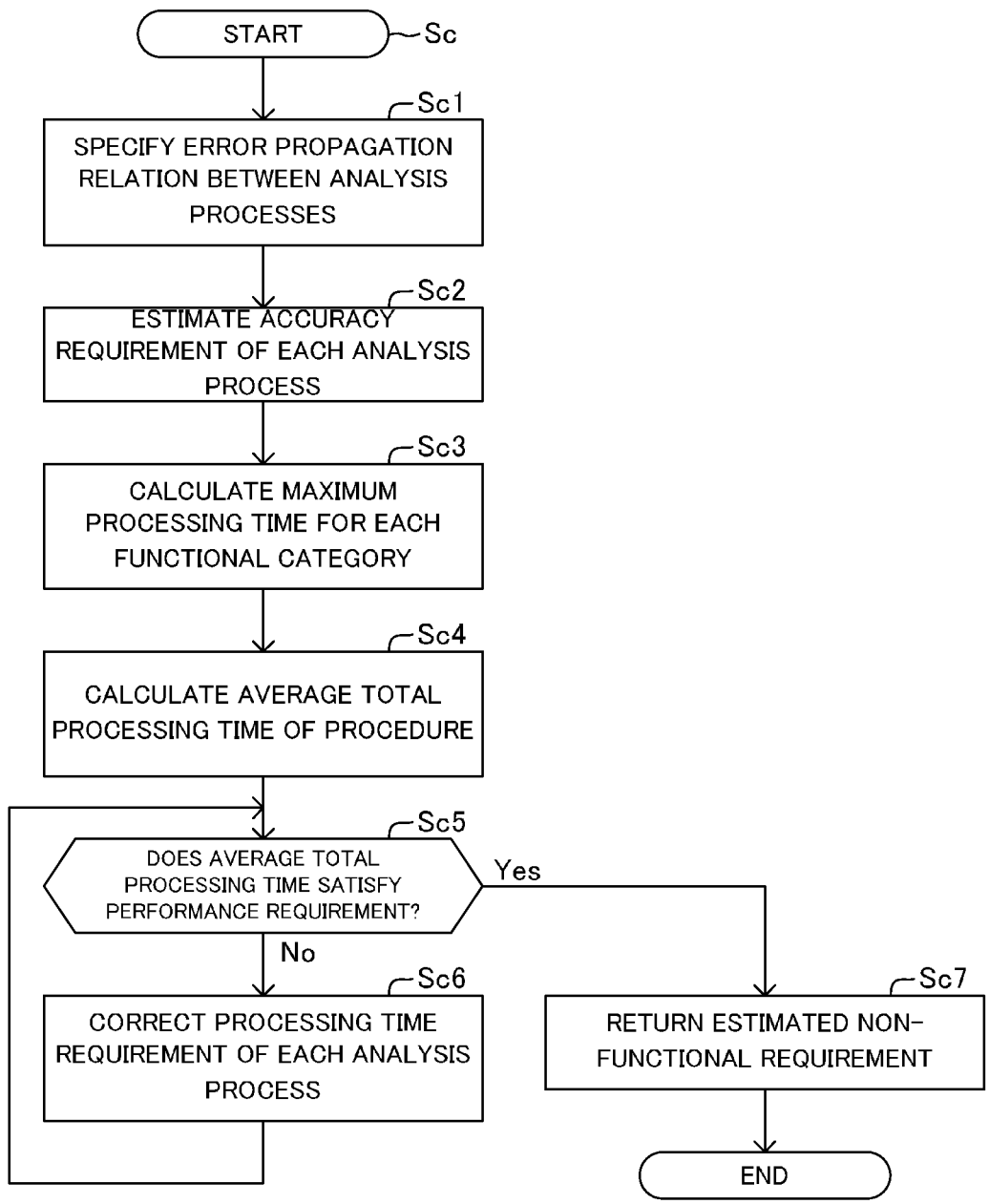
FIG. 6 is a flowchart showing a flow of a DB updating process executed in the procedure solving system disclosed in FIG. 1.
Figure 7:
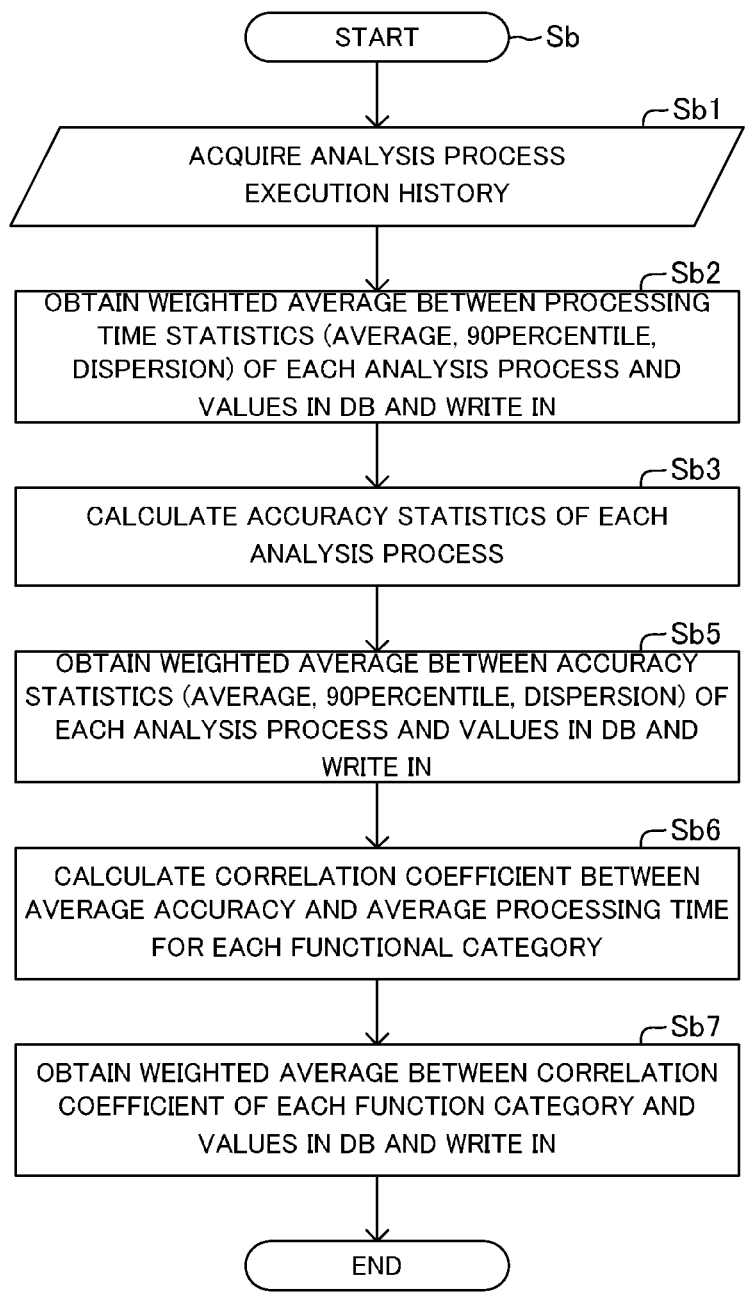
FIG. 7 is a flowchart showing a flow of an analysis process non-functional requirement estimation process executed in the procedure solving system disclosed in FIG. 1.
Figure 8:
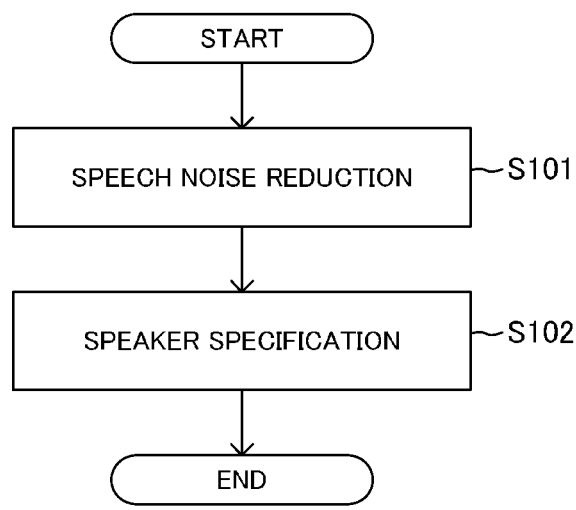
FIG. 8 is a diagram showing an example of a basic procedure in the procedure solving system disclosed in FIG. 1.
Figure 10:
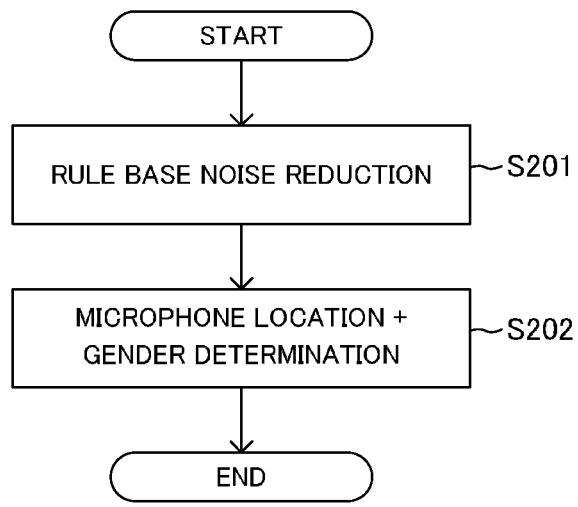
FIG. 10 is a diagram showing an example of a procedure obtained as a result in the procedure solving system disclosed in FIG. 1.

A first exemplary embodiment of the present invention will be described with reference to FIGS. 1 to 10. FIGS. 1 to 4 are diagrams for describing the configuration of a procedure solving system in this exemplary embodiment, and FIGS. 5 to 7 are diagrams for describing the operation thereof. FIGS. 8 to 10 are diagrams for describing a specific example of the procedure solving system.

[Configuration]

Figure 1:
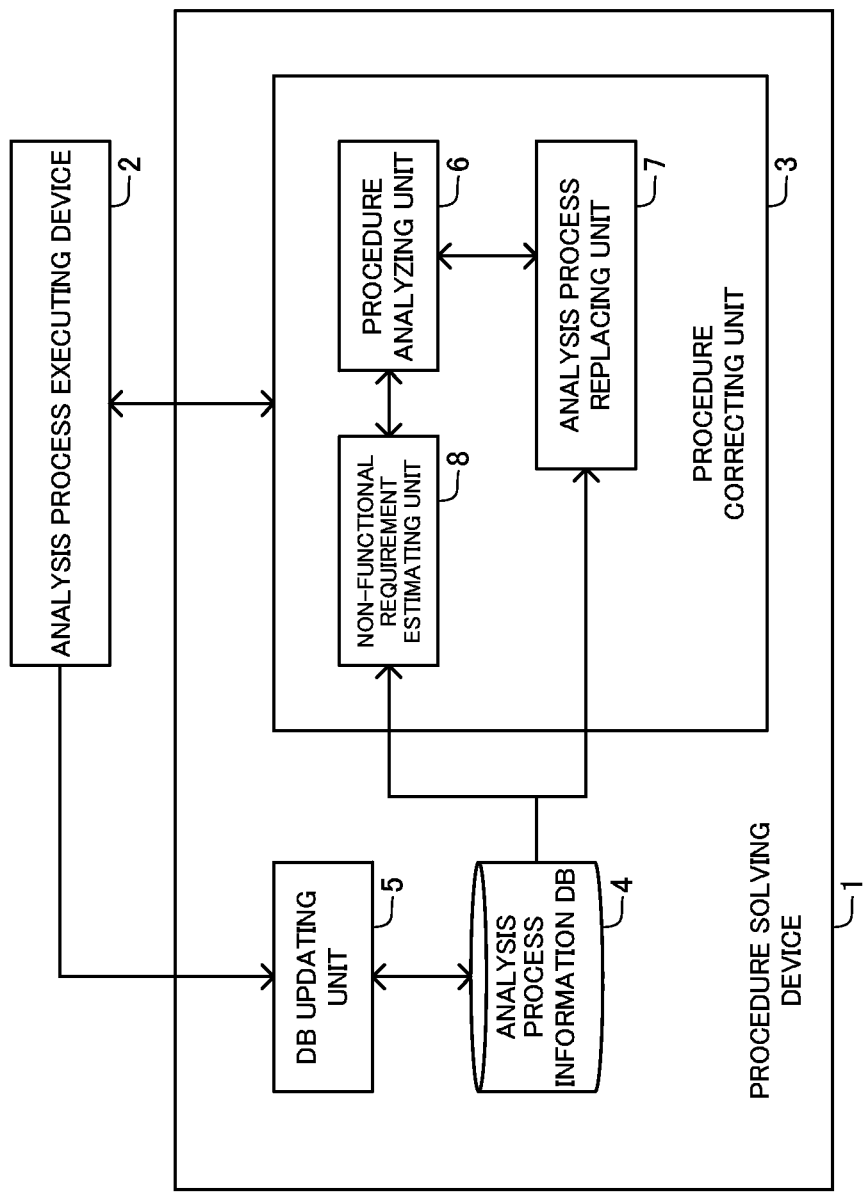
FIG. 1 is a function block diagram showing a whole configuration of a procedure solving system according to a first exemplary embodiment of the present invention.

A function block diagram showing the whole configuration of the procedure solving system in the first exemplary embodiment of the present invention is shown in FIG. 1. As shown in FIG. 1, the procedure solving system includes an analysis process execution device 2 and a procedure solving device 1 (an information processing device). The procedure solving system may be configured by one information processing device, or may be configured by a plurality of information processing devices.

The analysis process executing device 2 is a device which executes each process function actually in accordance with a set procedure. The analysis process executing device 2 transmits a basic procedure as a "functional requirement" and a "non-functional requirement" as a requirement required for the procedure to the procedure solving device 1 and requests correction of the basic procedure so that the non-functional requirement is satisfied. Moreover, the analysis process executing device 2 receives the corrected procedure from the procedure solving device 1, and actually executes each process function in accordance with the procedure.

Herein, the abovementioned "procedure" expresses the order to execute a series of analysis processes that provide process functions performing predetermined processes, respectively, by a parallel, serial, or serial-parallel combination. In the procedure, an analysis process is designated by an analysis process ID. Moreover, the "basic procedure" is a description of analysis processes executed in a procedure required by the analysis process executing device 2 and the order to execute the analysis processes, and is equivalent to a "functional requirement." In the basic procedure, the process of an analysis process can be designated by an analysis process ID, and the category of an analysis process can be designated by a function category ID.

Further, the abovementioned "non-functional requirement" (a performance requirement) is a performance requirement required for the whole "basic procedure" that is the "functional requirement" described above and is, for example, information such as the accuracy of analysis, a processing speed, memory consumption, disk consumption and the number of operations.

As shown in FIG. 1, the procedure solving device 1 includes a procedure correcting unit 3, analysis process information DB 4, and a DB updating unit 5. The procedure correcting unit 3 includes a procedure analyzing unit 6, an analysis process replacing unit 7, and a non-functional requirement estimating unit 8. The procedure correcting unit 3 and the DB updating unit 5 are realized by embedding programs into an arithmetic device installed in the procedure analyzing device 1. Moreover, the analysis process DB 4 is formed in a storage device installed in the procedure analyzing device 1. Below, the respective configurations will be described in detail.

The analysis process information DB 4 (a process function information storing means) stores performance information representing the performance of each of process functions that are analysis processes configuring the aforementioned procedure, for example, the analysis accuracy of and analysis processing time of each of the process functions. To be specific, the analysis process information DB 4 includes an analysis process functional information table TA, an analysis process non-functional information table TB, and a function-category accuracy processing-time correlation table TC.

The analysis process functional information table TA stores an "analysis process ID" for identifying each process function and a "function category ID" representing an analysis process type to which each process function belongs in association with each other as shown in FIG. 2. Herein, as the "analysis process ID," any expression can be used as far as it can uniquely specify a process function, such as a string and a URI. In the example shown in FIG. 2, a process function performing voiceprint recognition is provided with "voiceprint recognition" as an analysis process ID. Moreover, as the "function category ID," any expression can be used as far as it can uniquely specify the category of a process function, such as a string and a URI. The example shown in FIG. 2 illustrates that both process functions represented by analysis process IDs "voiceprint recognition" and "microphone position+gender determination," respectively, belong to a category represented by a function category ID "speaker specification."

The analysis process non-functional information table TB stores the performance of each process function. To be specific, as shown in FIG. 3, the analysis process non-functional information table TB stores an "analysis process ID" for identifying each process function and "statistical information of non-functional requirements" of the process function. In FIG. 3, "analysis process accuracy" and "analysis processing time" are set as non-functional requirements, and a case of storing "average," "90 Percentile" (a data value obtained when 90% of data is included at the time of arrangement of data) and a "coefficient of variation" (obtained by dividing a standard deviation value by an arithmetic average value) as statistical information of the non-functional requirements is shown as an example. Herein, as described above, as the analysis process ID, any expression can be used as far as it can uniquely specify a procedure, such as a string and a URI.

As shown in FIG. 4, the function-category accuracy processing-time correlation table TC stores, for each function category, a "coefficient of correlation" between an analysis processing time and analysis process accuracy with respect to a process function representing an analysis process belonging to the function category. This "coefficient of correlation" is, for example, a value obtained from a graph in which the analysis processing time and the analysis accuracy are plotted on the horizontal axis and the vertical axis, respectively. Moreover, the function-category accuracy processing-time correlation table TC includes a "processing time distribution width" showing a width between the maximum value and the minimum value of the analysis processing time of each process function belonging to each function category.

Next, the procedure correcting unit 3 will be described in detail. The procedure correcting unit 3 (a procedure correcting means) functions so as to receive the "basic procedure" as the "functional requirements" described above and the "non-functional requirements" from the analysis process executing device 2 and correct the "basic procedure" so that the whole "basic procedure" is the closest to the "non-functional requirements."

To be specific, the procedure analyzing unit 6 configuring the procedure correcting unit 3 analyzes the "basic procedure" received from the analysis process executing device 2, and calculates non-functional requirements for each process function set in each analysis process included in the procedure so that the whole process satisfies the requested non-functional requirements. Actually, in accordance with a request from the procedure analyzing unit 6, the non-functional requirement estimating unit 8 (a performance requirement estimating unit) estimates non-functional requirements for each process function as each analysis process. A method of the estimation will be described in detail in an operation description and an exemplary embodiment.

Further, the analysis process replacing unit 7 (an each-process-function correcting means) executes, on each analysis process included in the basic procedure, a process of retrieving an alternative analysis process that has an equivalent function to the analysis process and satisfies non-functional requirements from the analysis process DB 4 as an analysis process candidate and replacing the analysis process included in the basic procedure with the analysis process candidate.

The procedure correcting unit 3 returns the procedure corrected by the analysis process replacing unit 7 to the analysis process executing device 2. Consequently, the analysis process executing device 2 executes the analysis process in accordance with the corrected procedure.

Further, the DB updating unit 5 (a performance information updating means) receives the history of performance information of each process function, such as the accuracy of processing and a processing time when each analysis process has been actually executed by the analysis process executing device 2, and updates the information of the analysis process information DB 4.

[Operation]

Next, an operation of the procedure solving system described above will be explained with reference to flowcharts shown in FIGS. 5 to 7. FIG. 5 shows a procedure correcting process Sa in which the procedure correcting unit 3 receives a basic procedure as functional requirements and the target values of accuracy and performance as non-functional requirements from the analysis process executing device 2 and generates and returns an optimum procedure. FIG. 6 shows an analysis process non-functional requirement estimating process Sc in which the non-functional requirement estimating unit 8 estimates non-functional requirements for each analysis process included in the basic procedure in response to a request by the procedure correcting unit 3. FIG. 7 shows a DB updating process Sb in which the DB updating unit 5 acquires performance information such as the accuracy and processing time of each analysis process from the analysis process executing device 2 and updates the analysis process information DB 4.

First, the procedure correcting process Sa will be described in detail by using FIG. 5. In the procedure correcting process Sa, the procedure analyzing unit 6 firstly receives a procedure solving request from the analysis process executing device 2 (step Sa1: Yes). Next, the procedure analyzing unit 6 receives a basic procedure as functional requirements and a requirement of process accuracy and processing time (speed) as non-functional requirements from the analysis process executing device 2 (step Sa2). The basic procedure is described by using the analysis process ID or the function category ID used in the analysis process functional information table TA shown in FIG. 2.

Subsequently, based on the basic procedure and the non-functional requirements, the non-functional requirement estimating unit 8 estimates analysis process non-functional requirements (each-process-function performance requirements) as non-functional requirements of performance required for each analysis process (step Sc). A process of estimation of the analysis process non-functional requirements will be described later with reference to FIG. 6.

Subsequently, for each analysis process included in the basic procedure, the analysis process replacing unit 7 searches the analysis process information DB 4 by using the analysis process non-functional requirements calculated at step Sc corresponding to the analysis process and the ID of the analysis process, thereby searching for an analysis process that is another process function having the same function as the analysis process and that has non-functional requirements, namely, performance satisfying the abovementioned analysis process non-functional requirements, as an analysis process candidate (step Sa5). At this moment, in a case that more than one analysis process in the analysis process non-functional information table TB satisfy the non-functional requirements regarding the average process accuracy and the average processing time, an analysis process in which 90 Percentile and variation coefficient are the smallest is considered as the analysis process candidate.

Subsequently, the analysis process replacing unit 7 replaces an analysis process in the basic procedure corresponding to the analysis process candidate searched for at step Sa5 with the analysis process candidate (step Sa6). Then, the analysis process replacing unit 7 repeatedly executes the processes of steps Sa5 and Sa6 on all of the analysis processes included in the basic procedure (step Sa4). Finally, the procedure correcting unit 3 returns the procedure after correction to the analysis process executing device 2 (step Sa7).

Next, the analysis process non-functional requirement estimating process Sc will be described in detail with reference to FIG. 6. At first, the non-functional requirement estimating unit 8 specifies a "relation of propagation of error" in the basic procedure received from the procedure analyzing unit 6 (step Sc1). Herein, for specification of the "relation of propagation of error," it is calculated by using a preset law of propagation of error how much each analysis process has an influence on the way of propagation of error between analysis processes in the basic procedure and on the accuracy of analysis as the final result.

Then, by using the error propagation relation specified at step Sc1, the non-functional requirement estimating unit 8 estimates an accuracy requirement of each analysis process so that an accuracy requirement received from the procedure analyzing unit 6 is satisfied (step Sc2). This estimation is performed so that an accuracy requirement of an analysis process having a larger influence on the accuracy of analysis as the final result becomes higher. For example, it is possible to perform error estimation using error propagation on the assumption that "multiplication" in the case of an analysis process executed in series and "addition" in the case of an analysis process executed in parallel.

Subsequently, the non-functional requirement estimating unit 8 acquires average processing times of analysis processes belonging to a function category included in the basic procedure from the analysis process non-functional information table TB in the analysis process information DB 4, and calculates a maximum processing time of each function category (step Sc3). Then, by using the maximum processing times of the respective function categories calculated at step Sc3, the non-functional requirement estimating unit 8 calculates an average total processing time in the basic procedure (step Sc4).

Subsequently, the non-functional requirement estimating unit 8 confirms whether the calculated average total processing time satisfies a performance requirement received from the procedure analyzing unit 6 (step Sc5). In the confirmation at step Sc5, when the performance requirement is satisfied (step Sc5: Yes), the non-functional requirement estimating unit 8 returns the estimated non-functional requirement of each analysis process to the procedure analyzing unit 6 (step Sc7). In the confirmation at step Sc5, when the performance requirement is not satisfied (step Sc5: No), the non-functional requirement estimating unit 8 corrects the processing time requirement of each analysis process (step Sc6).

To be specific, at step Sc6, the non-functional requirement estimating unit 8 refers to the function-category accuracy processing-time correlation table TC in the analysis process information DB 4, and compares the coefficients of correlation between the accuracy of processing and a processing time of the respective function categories. Then, the non-functional requirement estimating unit 8 executes a process of tightening a processing time requirement for a process function category in which the correlation is low. Moreover, the non-functional requirement estimating unit 8 tightens a processing time requirement for a process function in which the accuracy requirement calculated at step Sc2 is low. For example, by the following formula (1), it is possible to calculate a new processing time requirement for a procedure i in the $n^{th}$ correction of a processing time requirement (wherein n>0).

$$Tin = Tin-1 - Tw_{CATi} \times (1 - C_{CATi}) \times 0.5^{n-1} \quad \text{(Formula 1)}$$

In this formula, "Ti n" represents a requested value of a processing time for the procedure i in the $n^{th}$ correction, "$Tw_{CATi}$" represents a processing time distribution width in a function category of the procedure i, and "$C_{CATi}$" represents a coefficient of correlation in a function category of the procedure i.

Subsequently, the non-functional requirement estimating unit 8 confirms whether the average total processing time corrected at step Sc6 satisfies the performance requirement received from the procedure analyzing unit 6, and repeatedly executes the process until the requirement is satisfied (step Sc5).

Next, the DB updating process Sb will be described in detail with reference to FIG. 7. FIG. 7 is a flowchart showing the flow of the DB updating process Sb executed in the procedure solving system.

In the DB updating process Sb, firstly, the DB updating unit 5 acquires an analysis process execution history which includes execution time when each analysis process has been executed, an analysis process ID, a processing time and accuracy information from the analysis process executing device 2 (step Sb1). Subsequently, the DB updating unit 5 calculates an average processing time for each analysis process based on the analysis process execution history (step Sb2). Subsequently, the DB updating unit 5 obtains the weighted average of the average processing time of each analysis process calculated at step Sb2 and the average processing time of a corresponding analysis process in the analysis process information DB 4, and updates the average processing time information in the analysis process information DB 4 (step Sb3).

Subsequently, the DB updating unit 5 calculates the average value of analysis process accuracy for each analysis process based on the analysis process execution history (step Sb4). Subsequently, the DB updating unit 5 obtains the weighted average of the average value of the accuracy of each analysis process calculated at step Sb4 and the average value of accuracy of a corresponding analysis process in the analysis process information DB 4, and updates the average accuracy value information in the analysis process information DB 4 (step Sb5).

Subsequently, for each function category, the DB updating unit 5 calculates a coefficient of correlation between the accuracy and a processing time between analysis processes belonging to the function category from the analysis process information DB 4 (step Sb6). Subsequently, the DB updating unit 5 obtains the weighted average of the correlation coefficient value of each function category calculated at step Sb6 and a correlation coefficient value of each function category in the analysis process information DB 4, and updates the correlation coefficient value of each function category in the analysis process information DB 4 (step Sb7). Herein, calculation and update of the average processing time (SB2, SB3) and calculation and update of the accuracy (Sb4, Sb5) may be executed in a different order or executed in parallel.

Example

A specific operation example of the procedure solving system mentioned above will be described with reference to FIGS. 8 to 10. It is assumed that a "basic procedure" inputted from the analysis process executing device 2 into the procedure correcting unit 3 is a procedure in which process functions "speech noise reduction" and "speaker specification" are connected in series as shown in FIG. 8. Moreover, an operation example in a case that "non-functional requirements" required for this basic procedure are as shown below will be described. The example described below shows a case that the basic procedure is described by using function category IDs.

Example of Non-Functional Requirements
1) Accuracy requirement: 0.65 or more
2) Processing time requirement: within 130 [msec]

The procedure correcting unit 3 operates in the following manner. First, the non-functional requirement estimating unit 8 specifies an error propagation relation from the basic procedure. At this moment, assuming from a preset law that the error of the respective process functions is "multiplication" when the basic procedure is an analysis process in which the respective process functions are executed in series and the error of the respective process functions is "addition" when the basic procedure is an analysis process in which the respective process functions are executed in parallel, error estimation by using error propagation is performed. Because two processes are connected in series in this basic procedure as shown in FIG. 8, a formula of an analysis result value is expressed by the following formula 2.

$$[\text{final result}] = R_{speech\ noise\ reduction} \times R_{speaker\ specification} \quad \text{(Formula 2)}$$

Because error propagation for the abovementioned multiplication and division is the "sum of relative errors" and error propagation for addition and subtraction is the "sum of absolute errors," the error propagation relation is expressed by the following formula 3.

$$[\text{final error}] = \text{relative error}_{speech\ noise\ reduction} + \text{relative error}_{speaker\ specification} \quad \text{(Formula 3)}$$

Subsequently, the accuracy requirement for each analysis process is estimated. From the abovementioned error propagation relation and accuracy requirement, the following formula 4 holds.

$$0.65 \geq 1 - (\text{relative error requirement}_{speech\ noise\ reduction} + \text{relative error requirement}_{speaker\ specification}) \quad \text{(Formula 4)}$$

Further, for the purpose of tightening the accuracy requirement of a pre-process, the following formula 5 is introduced.

$$\text{Relative error requirement}_{speech\ noise\ reduction} < \text{relative error requirement}_{speaker\ specification} \times \xi \quad \text{(Formula 5)}$$

Herein, $\xi$ denotes a constant determined for each system. For example, a constant used herein is 1.5.

By solving the two formulas 4 and 5 described above, a relative error requirement is calculated. Regardless of the abovementioned values, relative error requirements are calculated as shown below will be considered.

$$\text{Relative error requirement}_{speech\ noise\ reduction} = 1.2$$

$$\text{Relative error requirement}_{speaker\ specification} \times \xi = 2.2$$

Accordingly, the accuracy requirement of each analysis process can be calculated as shown on the line of "$0^{th}$ correction" in FIG. 9: the accuracy of speech noise reduction=88% and the accuracy of speaker specification=78%.

Subsequently, the maximum processing time for each function category of each analysis process is searched. From the information of the analysis process functional information table TA and the analysis process non-functional information table TB, for each function category of an analysis process included in the basic procedure shown in FIG. 8, the maximum processing time is searched. In this example, firstly, the average processing time 200 [msec] of voiceprint recognition is obtained regarding speaker specification as the function category, and the average processing time 20 [msec] of adaptive filter noise reduction is obtained regarding speech noise reduction. As a result, an estimation value of the processing time requirement for each process function in this stage is as shown on the line of the "$0^{th}$ correction" in FIG. 9.

Subsequently, the average total processing time of the whole procedure is calculated, and it is confirmed whether the performance requirements are satisfied. In this case, because the respective process functions are executed in series, the whole processing time is 220 [msec], which does not satisfy 130 [msec] as the requirement.

Because the calculated total processing time does not satisfy the non-functional requirement as mentioned above, correction of the processing time requirement of each analysis process is repeatedly performed. In this case, a processing time requirement for the $1^{st}$ correction is obtained by calculation of the abovementioned formula 1.

$$T_{speech\ noise\ reduction\ 1} = T_{speech\ noise\ reduction\ 0} - Tw_{speech\ noise\ reduction} \times$$
$$(1 - C_{speech\ noise\ reduction}) \times 0.5^0$$
$$= 20 - 3 \times (1 - 0.8) \times 1$$
$$= 19.6 [\text{msec}]$$

$$T_{speaker\ specification\ 1} = T_{speaker\ specification\ 0} - Tw_{speaker\ specification} \times$$
$$(1 - C_{speaker\ specification}) \times 0.5^0$$
$$= 200 - 150 \times (1 - 0.6) \times 1$$
$$= 140 [\text{msec}]$$

Because the $1^{st}$ average total processing time described above is "159.6" as shown on the line of the "$1^{st}$ correction" in FIG. 9 and does not satisfy the non-functional requirement "130 [msec] yet, second correction is performed.

Thus, the $2^{nd}$ correction is executed in the same manner as described above, and the result is as shown on the line of the "$2^{nd}$ correction" in FIG. 9. At this moment, the requested non-functional requirements are satisfied, and the estimated performance requirement is transmitted to the analysis process replacing unit 7.

The analysis process replacing unit 7 selects optimum analysis processes based on the basic procedure having been received and analysis process non-functional requirement information. Herein, regarding the basic procedure shown in FIG. 8, "rule base noise reduction" satisfying both the accuracy requirement and the processing time requirement is selected for speech noise reduction. For speaker specification, "microphone position+gender determination" is selected.

The analysis processes in the basic procedure are replaced with the selected analysis processes. The procedure after replacement includes rule base noise reduction (step S201) and microphone position+gender determination (step S202) as shown in FIG. 10. At last, the procedure correcting unit 3 returns the procedure described above as the result.

As described above, according to the present invention, the non-functional requirement estimating unit 8 estimates non-functional requirements for each analysis process included in a procedure and, in accordance with the estimated values thereof, the analysis process replacing unit 7 selects optimum analysis processes by using the information in the analysis process information DB 4. Therefore, it is possible to easily solve the procedure according to the accuracy of processing and a processing time requested by a user.

Further, the analysis process replacing unit 7 selects optimum analysis processes by using the information in the analysis process information DB 4, while the procedure correcting unit 3 does not arrange the order to execute the basic procedure. Consequently, the process cost relating to selection of analysis processes is determined by the number of analysis processes belonging to a function category included in the basic procedure, and therefore, it is possible to make calculation load lower than a conventional method in which the process cost increases depending on the number of combinations of analysis processes. Accordingly, the present invention can minimize decrease of the performance of the system.

[Supplementary Notes]

Figure 11:
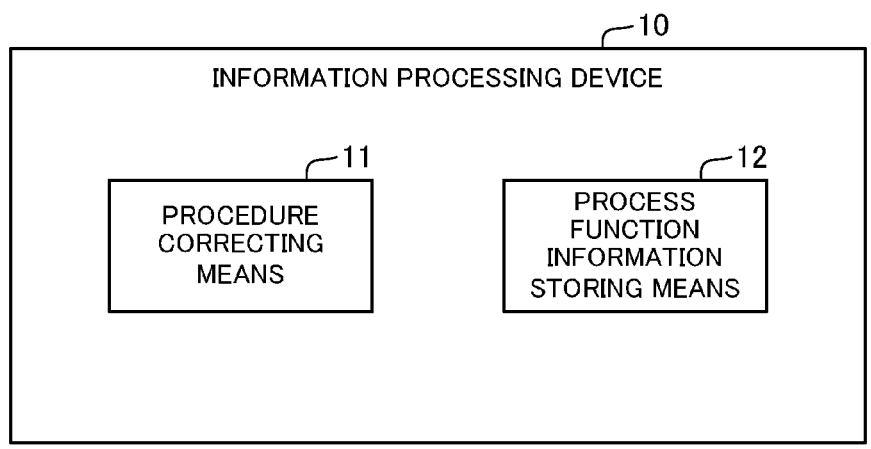
FIG. 11 is a block diagram showing a configuration of an information processing device according to Supplementary Note 1 of the present invention.

The whole or part of the exemplary embodiment disclosed above can be described as the following supplementary notes. Below, a schematic configuration of an information processing device according to the present invention will be described with reference to FIG. 11. However, the present invention is not limited to the following configurations.

(Supplementary Note 1)

An information processing device 10, including:

a process function information storing means 12 for storing performance information representing performance of respective process functions executing predetermined processes, respectively; and a procedure correcting means 11 for correcting a procedure composed of the process functions so that a performance requirement representing performance required for the whole procedure is satisfied based on the performance information of the respective process functions.

(Supplementary Note 2)

The information processing device according to Supplementary Note 1, wherein:

the process function information storing means is configured to store the respective process functions on a preset type basis; and the procedure correcting means is configured to correct the procedure by replacing any of the process functions in the procedure with another of the process functions of a same type as the said process function.

(Supplementary Note 3)

The information processing device according to Supplementary Note 1 or 2, wherein the procedure correcting means includes:

a performance requirement estimating means for estimating an each-process-function performance requirement representing performance required for each of the process functions in the procedure so that the performance requirement for the whole procedure is satisfied; and an each-process-function correcting means for correcting the procedure for each of the process functions in the procedure so that the each-process-function performance requirement is satisfied.

(Supplementary Note 4)

The information processing device according to Supplementary Note 3, wherein:

the performance includes accuracy of processing by each of the process functions; and the performance requirement estimating means is configured to, based on a preset propagation state of an error of accuracy of processing by the respective process functions between the process functions in the procedure, calculate an error of accuracy of processing for each of the process functions in the procedure, and estimate the each-process-function performance requirement that is a requirement of the accuracy of processing of each of the process functions.

(Supplementary Note 5)

The information processing device according to Supplementary Note 3 or 4, wherein:

the performance includes a time of processing by each of the process functions; and the performance requirement estimating means is configured to, based on a processing time distribution representing a width of a time of processing by the respective process functions set for each of types of the process functions, estimate the each-process-function performance requirement that is a requirement of a processing time for each of the process functions in the procedure.

(Supplementary Note 6)

The information processing device according to any of Supplementary Notes 1 to 5, including a performance information updating means for acquiring the performance information representing performance of the respective process functions measured in execution of the process functions, and updating the performance information in the process function information storing means based on the acquired performance information of the respective process functions.

(Supplementary Note 7)

A program including instructions for causing an information processing device including a process function information storing means for storing performance information representing performance of respective process functions executing predetermined processes, respectively, to realize:

a procedure correcting means for correcting a procedure composed of the process functions so that a performance requirement representing performance required for the whole procedure is satisfied based on the performance information of the respective process functions.

(Supplementary Note 8)

The program according to Supplementary Note 7, wherein:

the respective process functions are stored in the process function information storing means on a preset type basis; and the procedure correcting means is configured to correct the procedure by replacing any of the process functions in the procedure with another of the process functions of a same type as the said process function, by the procedure correcting means.

(Supplementary Note 9)

The program according to Supplementary Note 7 or 8, wherein the procedure correcting means includes:

a performance requirement estimating means for estimating an each-process-function performance requirement representing performance required for each of the process functions in the procedure so that the performance requirement for the whole procedure is satisfied; and an each-process-function correcting means for correcting the procedure for each of the process functions in the procedure so that the each-process-function performance requirement is satisfied.

(Supplementary Note 10)

An information processing method including, in an information processing device including a process function information storing means for storing performance information representing performance respective process functions executing predetermined processes, respectively, correcting a procedure composed of the process functions so that a performance requirement representing performance required for the whole procedure is satisfied based on the performance information of the respective process functions.

(Supplementary Note 11)

The information processing method according to Supplementary Note 10, wherein the respective process functions are stored in a process function information storing means on a preset type basis, the information processing method including correcting the procedure by replacing any the process functions in the procedure with another of the process functions of a same type as the said process function, by the procedure correcting means.

(Supplementary Note 12)

The information processing method according to Supplementary Note 10 or 11, including correcting the procedure by:

estimating an each-process-function performance requirement representing performance required for each of the process functions in the procedure so that the performance requirement for the whole procedure is satisfied; and correcting the procedure for each of the process functions in the procedure so that the each-process-function performance requirement is satisfied.

The present invention is based upon and claims the benefit of priority from Japanese patent application No. 2010-

248207, filed on Nov. 5, 2010, the disclosure of which is incorporated herein in its entirety by reference.

DESCRIPTION OF REFERENCE NUMERALS 1 procedure solving device
2 analysis process executing device
3 procedure correcting unit
4 analysis process information DB
5 DB updating unit
6 procedure analyzing unit
7 analysis process replacing unit
8 non-functional requirement estimating unit
10 information processing device
11 procedure correcting means
12 process function information storing means

What is claimed is:

1. An information processing device comprising:
a process function information storing unit configured to store performance information representing performance of respective process functions executing predetermined processes, respectively; and
a procedure correcting unit configured to correct a procedure comprising the process functions so that a performance requirement representing performance required for the whole procedure is satisfied based on the performance information of the respective process functions,
wherein the procedure correcting unit comprises:
a performance requirement estimating unit configured to estimate an each-process-function performance requirement representing performance required for each of the process functions in the procedure so that the performance requirement for the whole procedure is satisfied, the performance comprising accuracy of processing by a process function of the process functions; and
an each-process-function correcting unit configured to correct the procedure for each of the process functions in the procedure so that the each-process-function performance requirement is satisfied, and
the performance requirement estimating unit is further configured to, based on a preset propagation state of an error of accuracy of processing by the respective process functions between the process functions in the procedure, calculate an error of accuracy of processing for each of the process functions in the procedure, and estimate the each-process-function performance requirement that is a requirement of the accuracy of processing of each of the process functions.

2. The information processing device according to claim 1, wherein:
the process function information storing unit is further configured to store the respective process functions on a preset type basis; and
the procedure correcting unit is further configured to correct the procedure by replacing a process function of the process functions in the procedure with another of the process functions of a same type as the said process function.

3. The information processing device according to claim 1, wherein:
the performance comprises a time of processing by a process function of the process functions; and
the performance requirement estimating unit is further configured to, based on a processing time distribution representing a width of a time of processing by the respective process functions set for each of types of the process functions, estimate the each-process-function performance requirement that is a requirement of a processing time for each of the process functions in the procedure.

4. The information processing device according to claim 1, further comprising a performance information updating unit configured to acquire the performance information representing performance of the respective process functions measured in execution of the process functions, and update the performance information in the process function information storing unit based on the acquired performance information of the respective process functions.

5. A non-transitory computer-readable medium storing a program comprising instructions for causing an information processing device including a process function information storing unit for storing performance information representing performance of respective process functions executing predetermined processes, respectively, to realize:
a procedure correcting unit configured to correct a procedure comprising the process functions so that a performance requirement representing performance required for the whole procedure is satisfied based on the performance information of the respective process functions,
wherein the procedure correcting unit comprises:
a performance requirement estimating unit configured to estimate an each-process-function performance requirement representing performance required for each of the process functions in the procedure so that the performance requirement for the whole procedure is satisfied, the performance comprising accuracy of processing by a process function of the process functions; and
an each-process-function correcting unit configured to correct the procedure for each of the process functions in the procedure so that the each-process-function performance requirement is satisfied, and
the performance requirement estimating unit is further configured to, based on a preset propagation state of an error of accuracy of processing by the respective process functions between the process functions in the procedure, calculate an error of accuracy of processing for each of the process functions in the procedure, and estimate the each-process-function performance requirement that is a requirement of the accuracy of processing of each of the process functions.

6. The non-transitory computer-readable medium storing the program according to claim 5, wherein:
the respective process functions are stored in the process function information storing unit on a preset type basis; and
the procedure correcting unit is further configured to correct the procedure by replacing a process function of the process functions in the procedure with another of the process functions of a same type as the said process function, by the procedure correcting unit.

7. An information processing method comprising, in an information processing device including a process function information storing unit for storing performance information representing performance respective process functions executing predetermined processes, respectively, correcting a procedure composed of the process functions so that a performance requirement representing performance required for the whole procedure is satisfied based on the performance information of the respective process functions, wherein the procedure comprises:

estimating an each-process-function performance requirement representing performance required for each of the process functions in the procedure so that the performance requirement for the whole procedure is satisfied, the performance comprising accuracy of processing by a process function of the process functions;

correcting the procedure for each of the process functions in the procedure so that the each-process-function performance requirement is satisfied;

calculating an error of accuracy of processing for each of the process functions in the procedure based on a preset propagation state of an error of accuracy of processing by the respective process functions between the process functions in the procedure; and estimating the each-process-function performance requirement that is a requirement of the accuracy of processing of each of the process functions.

8. The information processing method according to claim 7, wherein the respective process functions are stored in a process function information storing unit on a preset type basis, and the information processing method further comprises correcting the procedure by replacing a process function of the process functions in the procedure with another of the process functions of a same type as the said process function, by the procedure correcting unit.

* * * * *